United States Patent
Sivaraman (10) Patent No.: US 11,669,824 B2
(45) Date of Patent: *Jun. 6, 2023

(54) SHARED MOBILE PAYMENTS

(71) Applicant: PayPal, Inc., San Jose, CA (US)

(72) Inventor: Sridhar Sivaraman, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,256

(22) Filed: Mar. 9, 2022

(65) Prior Publication Data

US 2022/0198426 A1 Jun. 23, 2022

Related U.S. Application Data (63) Continuation of application No. 16/000,575, filed on Jun. 5, 2018, now Pat. No. 11,361,298, which is a continuation of application No. 14/331,106, filed on Jul. 14, 2014, now Pat. No. 9,990,620, which is a continuation of application No. 13/720,584, filed on Dec. 19, 2012, now abandoned.

(60) Provisional application No. 61/577,471, filed on Dec. 19, 2011.

(51) Int. Cl.
G06Q 20/22 (2012.01)
G06Q 20/20 (2012.01)
G06Q 20/32 (2012.01)
G06Q 20/40 (2012.01)

(52) U.S. Cl.
CPC .......... *G06Q 20/22* (2013.01); *G06Q 20/20* (2013.01); *G06Q 20/227* (2013.01); *G06Q 20/322* (2013.01); *G06Q 20/3223* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 6,326,918 B1 | 12/2001 | Stewart | |
| 6,714,791 B2 | 3/2004 | Friedman | |
| 7,152,093 B2 | 12/2006 | Ludwig et al. | |
| 7,206,809 B2 | 4/2007 | Ludwig et al. | |
| 8,326,769 B1 | 12/2012 | Weisman | |
| 8,326,770 B1 | 12/2012 | Weisman | |
| 8,396,808 B2 | 3/2013 | Greenspan | |
| 8,509,734 B1 * | 8/2013 | Gupta | G06Q 20/12 455/406 |
| 10,839,384 B2 | 11/2020 | Wong et al. | |

(Continued)

FOREIGN PATENT DOCUMENTS

WO 2011014875 A1 2/2011

OTHER PUBLICATIONS

Think Computer Corporation, FaceCash Bill Splitting Video, Dec. 3, 2010, Retrieved on Apr. 8, 2014, Retrieved from the Internet: https://www.facecash.com/video/index.html?video=2, 2 pages.

*Primary Examiner* — Narayanswamy Subramanian
(74) *Attorney, Agent, or Firm* — Haynes & Boone, LLP (57) ABSTRACT

Methods and systems are provided for facilitating shared mobile payments. According to an embodiment, a user can initiate a purchase using a mobile device. The mobile device can display a total price for the purchase. The first user can cooperate with one or more second users to share the cost of the purchase. The cooperation can be facilitated via the first and second users' mobile devices.

20 Claims, 6 Drawing Sheets

(56) References Cited

U.S. PATENT DOCUMENTS

| | | |
|---|---|---|
| 10,915,881 B2 | 2/2021 | Kumar et al. |
| 2002/0123938 A1 | 9/2002 | Yu et al. |
| 2003/0229678 A1 | 12/2003 | Wen et al. |
| 2007/0011104 A1 | 1/2007 | Leger et al. |
| 2007/0108269 A1 | 5/2007 | Benco et al. |
| 2007/0203836 A1 | 8/2007 | Dodin |
| 2009/0119190 A1 | 5/2009 | Realini |
| 2010/0114733 A1 | 5/2010 | Collas et al. |
| 2010/0138344 A1 | 6/2010 | Wong et al. |
| 2011/0029416 A1 | 2/2011 | Greenspan |
| 2011/0320347 A1 | 12/2011 | Tumminaro et al. |
| 2012/0041879 A1 | 2/2012 | Kim et al. |
| 2012/0089461 A1 | 4/2012 | Greenspan |
| 2012/0150728 A1 | 6/2012 | Isaacson et al. |
| 2012/0197794 A1 | 8/2012 | Grigg et al. |
| 2013/0085931 A1 | 4/2013 | Runyan |
| 2013/0215116 A1 | 8/2013 | Siddique et al. |
| 2015/0170135 A1* | 6/2015 | Fourez ............... G06Q 20/40 705/21 |
| 2016/0210602 A1 | 7/2016 | Siddique et al. |
| 2016/0292663 A1 | 10/2016 | Sagan et al. |
| 2018/0082277 A1 | 3/2018 | Sagan et al. |
| 2018/0082283 A1 | 3/2018 | Sharma |
| 2018/0335928 A1 | 11/2018 | Van et al. |
| 2021/0224765 A1 | 7/2021 | Siddique et al. |
| 2022/0036336 A1* | 2/2022 | Goolkasian ............ H04L 67/34 |

* cited by examiner

SHARED MOBILE PAYMENTS

CROSS-REFERENCE TO RELATED APPLICATIONS

This application is a Continuation of U.S. patent application Ser. No. 16/000,575, filed Jun. 5, 2018, which is a continuation of U.S. patent application Ser. No. 14/331,106, filed Jul. 14, 2014, issued on Jun. 5, 2018 as U.S. Pat. No. 9,990,620, and which is a Continuation of U.S. patent application Ser. No. 13/720,584, filed Dec. 19, 2012, which claims the benefit of and priority to U.S. Provisional Application No. 61/577,471, filed on Dec. 19, 2011, the contents of which are incorporated by reference in its entirety.

BACKGROUND

Technical Field

The present disclosure generally relates to electronic commerce and, more particularly, relates to methods and systems for sharing mobile payments among users.

Related Art

The use of mobile devices, such as cellular telephones, to make purchases is well known. Such mobile devices can be used to make purchases from brick and mortar stores and from online stores. For example, such mobile devices can be used to pay for purchases via a credit card, debit card, gift card, or payment provider. Generally, a single person will pay for a purchase. However, there are instances where it is desirable to share the payment for a purchase among a plurality of people.

According to contemporary practice, if a plurality of people want to share the payment for a purchase, then one person often makes the entire payment and subsequently attempts to collect contributions from the other people. In some instances, the person who makes the entire payment may not be able to collect the contributions from some or all of the other people. Thus, the person making the entire payment may have to assume an undesirable risk in order to purchase the product.

DETAILED DESCRIPTION

Methods and systems are provided for facilitating shared mobile payments. According to an embodiment, a purchaser or first user can initiate a purchase using a mobile device. The mobile device can display a total price for the purchase. The first user can cooperate with one or more second users to share the cost of the purchase. The cooperation can be facilitated via the first user's mobile device and second users' mobile devices.

More particularly, the first user's mobile device can be near field communication (NFC) enabled and the first user can initiate the purchase using NFC. The purchase can be from an online merchant or can be from a brick and mortar store merchant. For a brick and mortar store purchase, the user can be at the brick and mortar store or can be away from the brick and mortar store.

To initiate an online purchase, the first user can select the product to be purchased from a merchant's web site. To initiate a brick and mortar store purchase, the first user can tap, scan, capture, or otherwise select an NFC sticker, a quick response (QR) code, a barcode, a stock keeping unit (SKU), or any other code, image, or the like that can be used to identify the product for a purchase. Although reference will be made herein to tapping an NFC sticker, such reference is by way of example only. The designation of the product to be purchase can be performed in any desired manner. Tapping the NFC sticker can cause an app to provide the second users with a link. The link can contain the transaction or reference ID for the purchase.

After the first user initiates the purchase, the first user may see a checkout or payment page. For example, the first user may see a payment page of a payment provider such as PayPal, Inc. A total payment amount for the purchase can be displayed on the payment page. The total amount can include any taxes, shipping costs, or other costs.

From the payment page the first user can attempt to share the cost of the purchase with one or more second users. Each second user can have an NFC enabled second user's mobile device. Thus, the first user can communicate with the second users via NFC. That is, to facilitate sharing of the cost of the purchase, the first user can use the first user's mobile device to communicate by NFC with one or more second users via the second users' mobile devices. The first user can communicate with the second users in any desired manner. For example, the first user can communicate with the second user by voice (in person or via the first user's mobile device and the second users' mobile devices), via text messaging, via email, or via any other method. In this manner, the first user can communicate an inquiry to the second users to determine if any of the second users want to share the cost of the purchase.

In response to the communication, one or more of the second users can enter an amount of their desired contribution to the cost of the purchase on their respective second users' devices to communicate the desired amount to the first user and/or make a payment in that amount. Alternatively, one or more of the second users can accept a default or suggested amount to contribute. The payment can be made to the first user, another second user, an intermediary, or the merchant. The intermediary can be a credit card company, a payment provider such as PayPal, Inc., or any other payment facilitator. There can be a plurality of intermediaries.

Any number of second users can contribute to the payment. For example, one, two, three, four, five, or more second users can contribute to the payment. The contribution can be substantially directly from the second user to the first user, the merchant, and/or the intermediary. The payment can be from one second user to another second user. The payment can be through any number or combination of the first user, the second users, the merchant, and the intermediary.

The first user can communicate with any number of second users to determine which second users will contribute to the cost of the purchase. Each second user can communicate with any number of other second users to determine which second users will contribute to the cost of the purchase. Thus, the requests for second users to contribute and the contributions of the second users can be along a number of different paths.

The contributions of the second users can go through the first user to make the payment (the second users can pay the first user who can then make the payment). The contributions of the second users can flow to the merchant, the intermediary, or another second user (from which the payment can ultimately flow to the merchant). The contributions of the second users can follow any desired route to the merchant.

The contribution of the first user can similarly flow to the merchant, the intermediary, or another second user (from which the payment can ultimately flow to the merchant). The contribution of the first user can follow any desired route to the merchant.

The first user and/or the second users can communicate among themselves regarding the purchase. For example, the first user and/or the second users can communicate among themselves using any combination of voice, email, text messaging, social networking, websites or blogs. In this manner, the first user and/or the second users can discuss any detail regarding the purchase, such as who will pick up the product or where the product is to be shipped. In this manner, the first user and/or the second users can agree upon a plan for sharing the payment, e.g., can determine the amount of each person's contribution. The contributions can be substantially equal. The contributions can be different or unequal. Generally, any one of the first user and the second users can contribute any amount between zero and the total purchase price.

Alternatively, only predefined types of amounts can be allowed. For example, equal contributions can be required. As a further example, even dollar amounts (amounts with no cents) can be generally required of the second users with any remaining unequal amount (such as an amount with cents) to be contributed by the first user (or a designated second user).

According to an embodiment, a shared payment app can facilitate the selection of the product to be purchased and can facilitate communication among the first user and/or the second users. For example, the shared payment app can facilitate the selection of the product from the merchant's website by clicking on the product and/or can facilitate the selection of the product from a brick and mortar store by tapping an NFC sticker.

As a result of the communication and contribution processes, a group payment can be made. The first user can initiate the purchase and payment processes and the second users, along with the first user, can share in the payment. The use of NFC, tapping, or the like can provide a fun and easy way for users to share the payment, thus promoting user of the system. The purchased product can be picked up in the brick and mortar store by the first user or any of the second users. The purchased product can be shipped to the first user or any of the second users.

Predefined groups of contributors can be defined, such as during a setup process. The use of such predefined groups can be beneficial when the members are substantially the same for a plurality of shared purchases. Such predefined groups can be modified (members can be added or deleted) substantially in real time.

A plurality of predefined groups can be defined, such as during the setup process. Any number of such groups can be predefined. Examples of such predefined groups can include family, friends, church members, club members, co-workers, employees, and business partners. The members of the groups can be any people, businesses, or other entities. Thus, different groups having different members can be defined for different types of purchases. Any desired number of groups can be defined. Any desired criteria can be used to define a group. The group can be based upon no criteria other than the first user's desire to include people in the group. The first user can be considered to be a member of the group.

For example, the cost of a meal eaten by co-workers who frequently eat together can be shared among the co-workers. That is, the first user can define a group that contains those co-workers with whom the first user frequently eats lunch. The group can be modified as necessary to account for any added or missing co-workers for a particular lunch. The modified group can define the second users.

As a further example, purchases that would benefit a business can be shared among the business owners or partners. For example, the purchase of a new copy machine can be shared among the owners of a small business using the shared mobile payments method discussed herein.

The group can be an ad hoc group. Thus, the group can be defined substantially in real time. The same group that was initially an ad hoc group can be used repeatedly, with or without modification (the addition or subtraction of members). The group can be used one time or can be used a plurality of times. For example, several co-workers who decide for the first time to have lunch together can define an ad hoc group. The same group of co-workers can eat together at a later time and the first user can re-use the ad hoc group to define the second users. Thus, an ad hoc group can become a predefined group.

For example, the cost of a meal eaten by co-workers who rarely eat together or who are eating together for the first time can be shared among the co-workers. The group can be defined just for the one meal, e.g., can be an ad hoc group. The group can be used only for the one meal or can be used again in the future, such as for another meal. Modifications to the group can be made substantially in real time, such as when the same group with one other member has a meal together in the future. Thus, ad hoc groups, like predefined groups, can be modified to accommodate missing or new members.

According to an embodiment, the calculation of the first user's share and/or at least one second user's share can be performed iteratively. The calculation can be performed iteratively to accommodate real time changes to the contributions or expected contributions. For example, if the total purchase price is $100 and there are five potential contributors (the first user and four potential second users), then the expected contributions can be $20 each. However, if one of the potential second users declines to contribute, then the shared payment app can recalculate the needed contributions to be $25 each. If one of the remaining four users then decides to pay $40 (instead of $25), then the other three user's contributions can be recalculated as $20 each. Thus, adjustments can be made substantially in real time to accommodate variances in the contributions. The calculation of contributions can iterate, as necessary.

The communication, such between the first user's mobile device and/or the second users' mobile devices, can exchange or provide necessary information for processing the payment through the payment provider or the like. For example, when the first user taps the NFC sticker, the shared payment app can open automatically and the shared payment app can commence communication with the payment provider. The tapped NFC sticker can include information such as an item description and price, as well as any taxes and shipping charges. The tapped NFC sticker can direct the user to a source of such information, such as a website of the merchant. The tapped NFC sticker can direct the user to a location (such as a link or memory location) on the first user's mobile device or to a website that enables the first user to make the desired purchase.

During the payment process, the first user can be requested to enter login credentials, such as a user name, an email address, a phone number, a password, and/or a personal identification number (PIN). The first user can be shown a total amount for the purchase, such as on the mobile device display. Before confirming the payment, the first user can be asked if the first user would like to share the payment with any second users, such as via a button or link of the shared payment app. According to an embodiment, no such request is made. According to yet another embodiment, the sharing of the payment can occur after the first user has made the payment.

According to an embodiment, a default sharing process can be automatically initiated. The default sharing process can use a predefine group of second users. The default sharing process can use default parameters, such as how the payment is to be shared (such as with equal contributions or with unequal contributions).

If the first user wishes to share the payment with others (second users), the first user's mobile device can communicate information to the mobile devices of the second users, such as via NFC. The communication can include a user identifier (e.g., phone number, device ID, user name, account number, etc.), total payment amount, and/or merchant identifier (e.g., account number, name, etc.).

If an indication is present that the current payment request or payment is to be shared, the communication may enable the second user's device to make a payment directly to the user's account, to the merchant's account, to an intermediary's account, or to the account of another second user. The indication may be from the pending payment request on the first user device, the first user selecting an option to share the payment, or some other means. The second users may enter the amount of payment and process accordingly, such as by entering any requested authentication information and confirming the payment.

According to an embodiment, the system can comprise one or more memories storing information regarding a first user and a plurality of second users. One or more processors can be operable to receive a first communication including an indication of a desire of the first user to purchase a product and to share payment for the product with the second users. The one or more processors can be further operable to access the information to determine communication addresses for the second users. The one or more processors can be further operable to send a second communication to the second users requesting that the second users share payment for the product. The one or more processors can be further operable to facilitate payment to the merchant from the second users who agree to share payment for the product. The second communication can be sent by NFC. The second communication can be sent by NFC means other than NFC, such as voice, text message, email, website, web blog, or social network.

At least one of the one or more memories can be a memory of a first user's mobile device. At least one of the one or more memories can be a memory of a server. At least one of the one or more processors can be a processor of a first user's mobile device and the second communication is received from an input device (such as a keypad or touchscreen) of the first user's mobile device. At least one of the one or more processors is a processor of a server and the second communication is received from a first user's mobile device.

At least one of the one or more memories can be a memory of a first user's mobile device. At least one of the one or more processors can be a processor the first user's mobile device. The first user's mobile device can be near field communication enabled. At least one of the one or more memories can be a memory of a first user's mobile device. At least one of the one or more processors can be a processor the first user's mobile device. The first user's mobile device can be configured to scan a code/sticker. The second users' mobile devices can similarly be configured to scan a code/sticker.

The distinction between the first user and the second users can be unimportant and arbitrary. However, the first user can be the user that initiates the shared purchase process, such as by tapping an NFC sticker. The second users can be those users who subsequently contribute to the shared purchase.

The one or more processors can be operable to receive the first communication from a first user's mobile device and the information can be representative of a scan of a near field communication (NFC) sticker, a quick response (QR) code, a barcode, a stock keeping unit (SKU), or the like. The communication to the second users can be sent via near field communication or by any other means.

The one or more processors can be further operable to facilitate payment from second users directly to the merchant. The one or more processors can be further operable to facilitate payment from second users through an intermediary to the merchant. The one or more processors can be further operable to facilitate payment from second users through the first user to the merchant.

The one or more processors can be operable to display a total price for the product. If more than one product is being purchased, an itemized list of the products being purchased, along with their prices can be displayed. Any additional costs can be displayed. For example, any taxes, delivery charges, tips, or the like can be displayed. The one or more processors can be operable to display contributions of the second users.

A message can be displayed. For example, a message from the first user to the second users can be displayed. The message can be part of the second communication. The message can be displayed on the first user's mobile device. The message can be separate from the first communication. The message can contain any desired information. The message can contain a reason for making the purchase. The message can merely be a greeting. An example of the message can be "For Sam's birthday." Another example of the message can be "If you are going with us to Las Vegas, please contribute for the hotel room."

Messages from one or more of the second users can be displayed. The messages can be displayed on the first user's mobile device and/or can be displayed on one or more of the second users' mobile devices. The message can be a response to the second communication, which requests that the second users share payment for the product. The message can contain any desired information or question. The message can contain a reason for not contributing to the purchase. The message can merely be a greeting. An example of such a message can be "Sam who?" Another example of such a message can be "See you in Vegas."

The one or more processors can be further operable to substantially equally divide the purchase price among the first user and the second users to determine a divided purchase price. The one or more processors can be further operable to send the second communication to the second users, wherein the second communication requests that each of the second users contribute the divided purchase price to share payment for the product. The second message can be a standard or default message. An example of such a default message can be "Bill requests that you contribute to this purchase of office supplies."

The information can be account information. For example, the information can be identification and contact information, such as for the second users. More particularly, the information can include an email address, texting address, telephone number, home address, or the like. The email address, texting address, and/or telephone number can be used to send the second communication from the first user to the second user. The home address can be used for mailing the purchased product to one of the second users.

The one or more processors can be further operable to sum contributions of the second users to determine a needed contribution of the first user. Thus, the amount of the contributions of the second users can be added together and this sum can be subtracted from the total cost of the purchase to determine how much the first user needs to contribute. The amount that the first user needs to contribute can be displayed by the user's mobile device. This can be particularly useful when the first user's contribution is not equal to each of the second users' contributions. The first user's contribution can be unequal to each of the second users' contributions when a fixed amount is request from each of the second users and the amount is not changed to account for any second users who do not contribute.

The one or more processors can be further operable to dynamically recalculate the contribution needed from each second user and/or the first user when one or more of the second users do not contribute to the purchase. The one or more processors can be further operable to dynamically recalculate the contribution needed from each second user and/or the first user when one or more of the second users contribute an amount different from that requested to the purchase. This process of recalculating the contribution and communicating the recalculated contribution can continue iteratively and indefinitely.

According to an embodiment, a method can comprise storing, in one or more memories, information regarding a first user and a plurality of second users. A first communication can be received, electronically via one or more processors. The first communication can include an indication of a desire of the first user to purchase a product and to share payment for the product with the second users. The information can be accessed, electronically via the one or more processors. The information can be accessed to determine communication addresses for the second users. A second communication can be sent, electronically via one or more processors. The second communication can be sent to the second users requesting that the second users share payment for the product. A payment can be facilitated, electronically via one or more processors. The payment can be to the merchant from the second users who agree to share payment for the product.

According to an embodiment, a computer program product can comprise a non-transitory computer readable medium having computer readable and executable code. The code can be for instructing one or more processors to perform any of the methods discussed herein.

Figure 1:
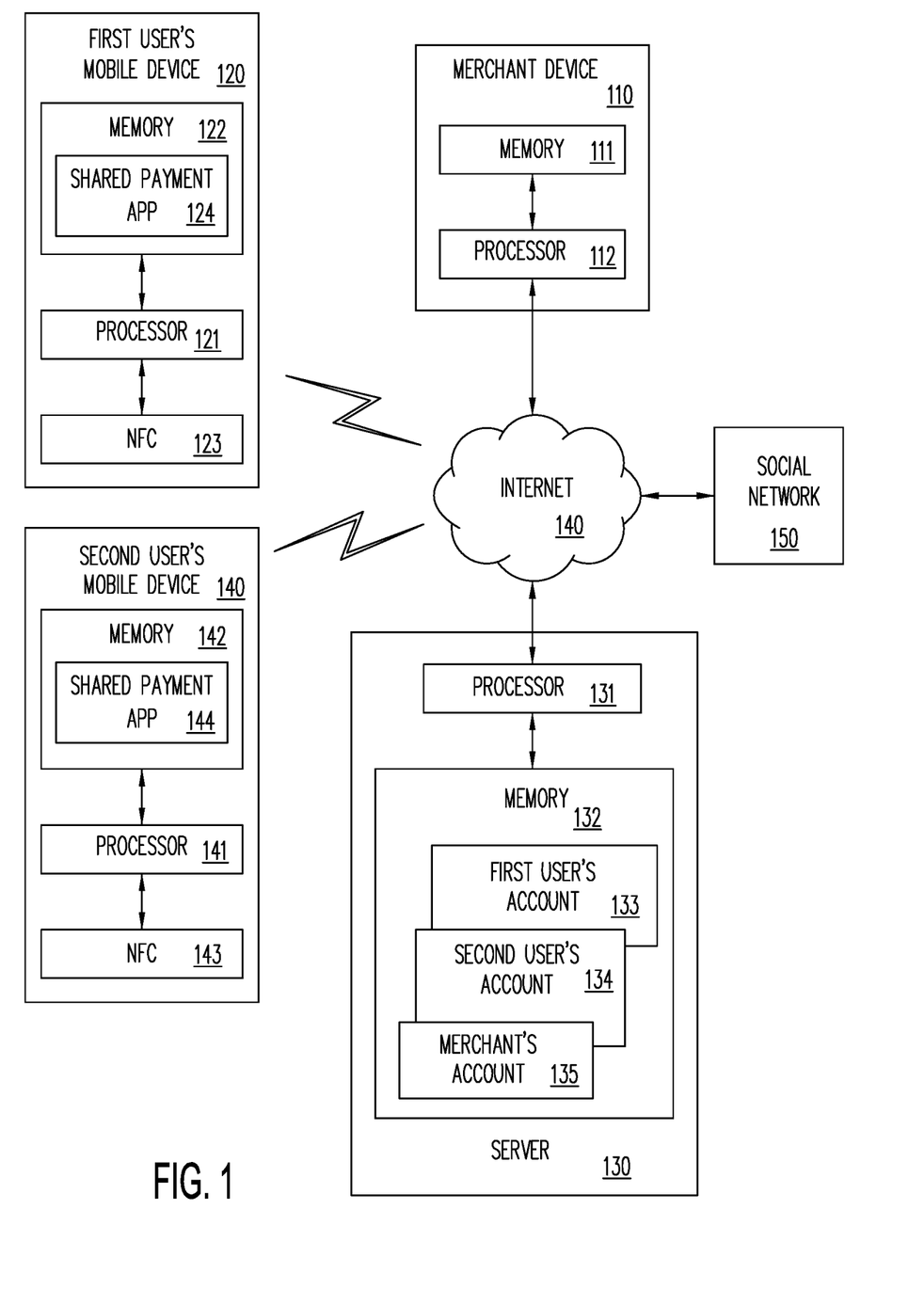
FIG. 1 is a block diagram of a system for facilitating shared mobile payments, according to an embodiment.

FIG. 1 is a block diagram of a system for providing shared mobile payments, according to an embodiment. The system can include a merchant device 110. The merchant device 110 can be a merchant checkout terminal, a computer, and/or a server, for example. The merchant device 110 can include a memory 111 and a processor 112. The merchant device 110 can be used for accepting payment for a product being purchased from the merchant. The payment can be a shared payment. The payment can be a partial payment, such as resulting from the sharing process. As discussed herein, the payment can be from one person or from a plurality of people and/or the payment can be through an intermediary.

The system can include a first user's mobile device 120. The first user's mobile device 120 can be carried by the first user. The first user's mobile device 120 can be a cellular telephone, a smart telephone, a hand held computer, a laptop computer, a notebook computer, or a tablet computer, for example. The first user's mobile device 120 can include a processor 121, a memory 122, and/or a near field communications (NFC) device 123. The first user's mobile device 120 can be NFC enabled.

The first user's mobile device 120 can be used to initiate the purchase process by scanning, or imaging an NFC sticker, a quick response (QR) code, a barcode, a stock keeping unit (SKU), or the like. Such scanning or imaging can be effected by tapping (e.g., bringing in close proximity or actual contacting) the NFC sticker with the first user's mobile device 120. Such tapping can include contacting the NFC sticker or a nearby surface or not contacting the NFC sticker or nearby surface. Although the use of tapping an NFC sticker is referred to herein, such as by way of example only. Any method of scanning or imaging can be used.

The first user's mobile device 120 can be used for requesting contributions from one or more second users for a shared purchased. The first user's mobile device 120 can be used to receive or route the contributions from the second users. For example, the first user's mobile device can be used to route the contributions, either directly or indirectly, from the second users to the merchant. The first user's mobile device 120 can be used to pay the merchant for the product purchased, such as by using the shared contributions.

A shared payment app 124 can be stored in the memory 122 and executed by the processor 121. The shared payment app 124 can be used for requesting the contributions, receiving the contributions, routing the contributions, and making payment, either directly or indirectly, to the merchant for the shared purchase.

The system can include a plurality of second users' mobile devices 140. The system can include any number of second users' mobile devices 140. For example, the system can comprise three, five, ten, twenty five, one hundred, or more second users' mobile devices. The second users' mobile devices 140 can be carried by any number of second users. The second users' mobile devices 140 can be cellular telephones, smart telephones, hand held computers, laptop computers, notebook computers, or tablet computers, for example. The other mobile device 140 can similarly include a processor 141, a memory 142, and a near field communications (NFC) device 143. A shared payment app 144 can be stored in the memory 142 and executed by the processor 141. The second users' mobile device 140 can be NFC enabled. The second users' mobile devices can be substantially identical to the first user's mobile device 120.

The second users' mobile devices 140 can be used for receiving requests for contributions for the shared purpose, for making additional requests for contributions, for routing the contributions, and for making payment, either directly or indirectly, to the merchant for the shared purchase.

The shared payment app 144 can be executed by the processor 141. The shared payment app 144 can be used for receiving requests for contributions for the shared purchase, for making additional requests for contributions, for routing the contributions, and for making payment, either directly or indirectly, to the merchant for the shared purchase. The first user's mobile device 140 can be substantially identical with respect to the second users' mobile devices 140 or can be different with respect thereto. The shared payment app 124 of the first user's mobile device 120 can be substantially identical with respect to the shared payment app 144 of the second users' mobile devices 140.

A global positioning system (GPS), such as a GPS of the second user's mobile devices 140 can be used to determine whether or not a request for a contribution is to be sent to a particular second user. In some instances, it can be desirable to only send requests for contributions to those second users within a particular geographic area. For example, if the first user is to meet with the second users to attend a play shortly and wants to perform a shared purchase of tickets for the play, then it may be desirable to omit any second users from the requests for contributions who are currently out of town. Thus, the second communication can depend upon the GPS location of each second user and can be tailored or omitted depending upon their GPS location.

The system can include a server 130. The server 130 can be a server of a bank, a credit card company, a payment provider such as PayPal, Inc., or any other entity. The server can be a server of an intermediary, such as a payment facilitating intermediary. The server 130 can be a single server or can be a plurality of servers. The server 130 can include one or more processors 131 and a memory 132. The memory 132 can be a memory of the server 130 or a memory that is associated with the server 130. The memory 132 can be a distributed memory. The memory 132 can store a first user's account 133, one or more second users' accounts 134, and a plurality of merchant's account 135.

The server 130 can be used for facilitating payment from the first user and the second users to the merchant. The server can control routing of such payments. The server can control routing of contribution requests. The server can have other functions, as well. For example, the server can be used for other (non-shared) payment processing functions.

A social network 150 can be used by the first user and/or one or more of the second users. The social network 150 can contain information regarding the first user and/or the second users. For example, the social network 150 can contain contact information that can be used by the system to contact one or more of the second users for contributions to the purchase.

The merchant device 110, the first user's mobile device 120, the second users' mobile devices 140, the server 130, and the social network 150 can communicate with one another via a network, such as the Internet 140. The merchant device 110, the first user's mobile device 120, the second users' mobile devices 140, the server 130, and the social network 150 can communicate with one another via one or more networks, such as local area networks (LANs), wide area networks (WANs), cellular telephone networks, and the like. The merchant device 110, the first user's mobile device 120, the second users' mobile devices 140, the server 130, and the social network 150 can communicate with one another, at least partially, via one or more near field communication (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
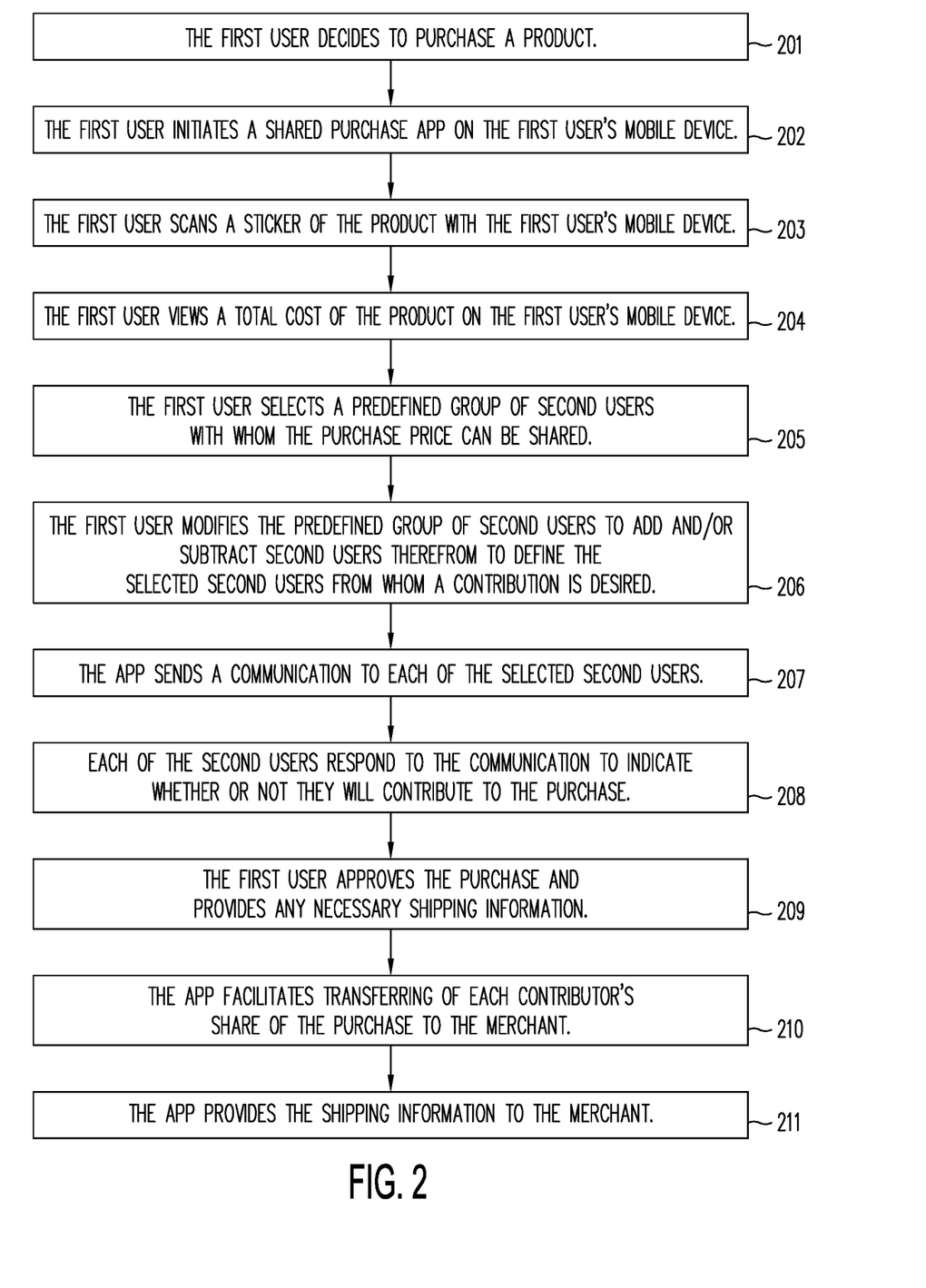
FIG. 2 is a flow chart showing a method for facilitating shared mobile payments, according to an embodiment.
Figure 3:
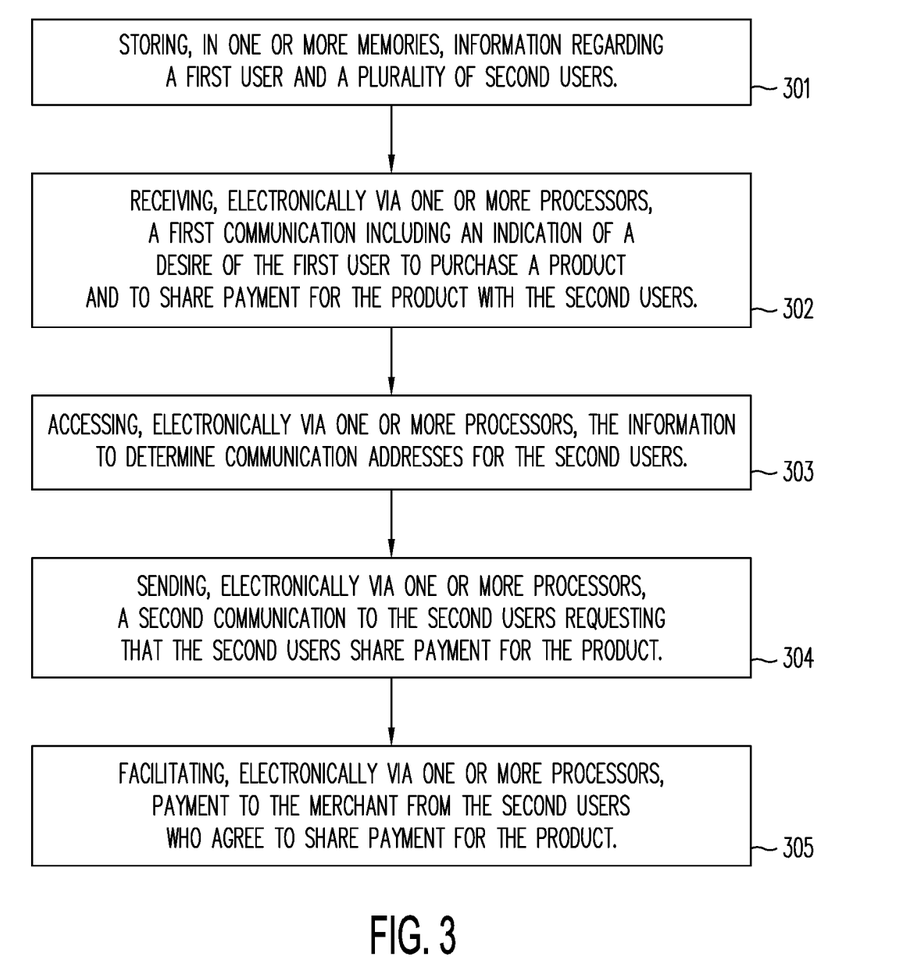
FIG. 3 is a flow chart showing further detail of the method for facilitating shared mobile payments, according to an embodiment.

FIGS. 2 and 3 are flow charts that describe examples of operation of the shared mobile payments system according to embodiments thereof. Note that one or more of the steps described herein may be combined, omitted, or performed in a different order, as desired or appropriate.

FIG. 2 is a flow chart showing a method for providing shared mobile payments, according to an embodiment. The first user can decide to purchase a product, as shown in step 201. The first user can see the product, an advertisement for the product, or an NFC sticker for the product in a store, on an advertising display, on a webpage, or anywhere else. The NFC sticker can be on the product, near the product, or remotely located with respect to the product.

The first user can initiate the shared payment app 124 on the first user's mobile device 120, as shown in step 202. The first user can initiate the shared payment app 124 by selecting an icon on the screen of the first user's mobile device 120, for example. The first user can initiate the shared payment app 124 by tapping the NFC sticker with the first user's mobile device 120. The first user can initiate the shared payment app 124 by any other means.

The first user can scan the NFC sticker of the product with the first user's mobile device, as shown in step 203. The first user can scan the NFC sticker by bringing the first user's mobile device 120 close to the NFC sticker and/or by tapping the NFC sticker. The first user can scan the NFC sticker or any other identification of the product by any other means.

The first user can view a cost of the product on the first user's mobile device 120, as shown in step 204. The cost can be a total cost, including any taxes, shipping costs, or other costs. The first user can view the potential cost for when the purchase is shared. For example, the cost of sharing among two, three, four, five, or more people can be shown to give the user an idea of how sharing lowers the cost and to better facilitate budgeting and planning by the user.

The first user can select a group of second users with whom the purchase price can be shared, as shown in step 205. The group can be a predefined group. For example, the group can be predefined during a setup process. The user can predefine any desired number of groups. The group can be selected from a plurality of groups for a particular purchase. Two or more groups can be combined for the particular purchase. For example, a group including friends and a group including family can be combined for the particular purchase.

Alternatively, the first user can define the group from scratch. The first user can manually enter information (such as names, email addresses, text addresses, telephone numbers) defining the second users, can select the second users from a list (such as a contacts list, list of potential second users, social network, or the like), and/or can tap user device with people proximate the first user. The first user can define the group in any desired manner.

The first user can modify the predefined group of second users by adding and/or subtracting second users therefrom to define the selected second users from whom a contribution is desired, as shown in step 206. The first user can add and/or subtract any second users to or from the group, as desired.

The shared payment app 124 can send a communication to each of the selected second users, as shown in step 207. A message from the first user to each of the first users or to selected ones of the second users can be included in the communication.

Each of the second users can respond to the communication to indicate whether or not they will contribute to the purchase, as shown in step 208. A message from the second users to the first user and/or to other second users can be included in the response.

If enough of the second users respond with contributions, the first user can approve the purchase and provide any necessary shipping information, as shown in step 209. In enough of the second users do not respond with contributions, the first user can withdraw from the purchase. If enough of the second users do not respond with contributions, the first user can add additional second users, withdraw from the purchase, initiate another purchase, or try to obtain contributions from a different group of second users.

According to an embodiment, the first user can withdraw from the purchase at any time prior to approving the purchase. Thus, if there are insufficient second users who are willing to contribute or if their total contributions are insufficient, then the first user can withdraw from the purchase. The first user can initiate another purchase whether the first purchase is approved or not. The other purchase can use the same group or a different group of contributors. The other purchase can be for the same or a different product, such as a less expensive product or a product that is more likely to attract sufficient contributions.

The shared payment app 124 can facilitate transferring of each contributor's share of the purchase to the merchant, as shown in step 210. Each contributor's share of the payment can be made to the merchant directly, via one or more other contributors, and/or via an intermediary.

The shared purchase app 124 can provide the shipping information to the merchant, as shown in step 211. The shipping information can be predefine, such as during a setup process. The shipping information can be defined substantially in real time. The purchased product can be shipped to any desired destination.

FIG. 3 is a flow chart showing further detail of the method for providing shared mobile payments, according to an embodiment. The method can comprise storing, in one or more memories, information regarding a first user and a plurality of second users, as shown in step 301. The one or more memories can include the memory 122 of the user device 120, the memory 132 of the server 130, a memory of the social network 150, or any other memory.

The method can further comprise receiving, electronically via one or more processors, a first communication. The first communication can include an indication of a desire of the first user to purchase a product. The first communication can further include an indication of a desire of the first user to share payment for the product with the second users, as shown in step 302. The communication can be received from the first user device 120, for example. The communication can be received by the server 130, for example.

The method can further comprise accessing, electronically via one or more processors, the information to determine communication addresses for the second users, as shown in step 303. The communication addresses can be telephone numbers, texting numbers, email addresses, links, or any other type of communication addresses. The communication addresses can be stored in the memory 122 of the user device 120, the memory 132 of the server 130, a memory of the social network 150, or any other memory.

The method can further comprise sending, electronically via one or more processors, a second communication to the second users requesting that the second users share payment for the product, as shown in step 304. The second communication can be sent to each of the second users at the communication address thereof. The second communication can be sent to more than one communication address for each of the second users. The second communication can be sent from the first user's mobile device 120 to each of the group's second users' mobile devices, for example. The second communication can be sent from the server 130 to each of the group's second users' mobile devices, for example.

The method can further comprise facilitating, electronically via one or more processors, payment to the merchant from the second users who agree to share payment for the product, as shown in step 305. The payment can be provided to the merchant from each of the second users by any desired route or method, examples of which are discussed herein.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the shared payment app 124, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
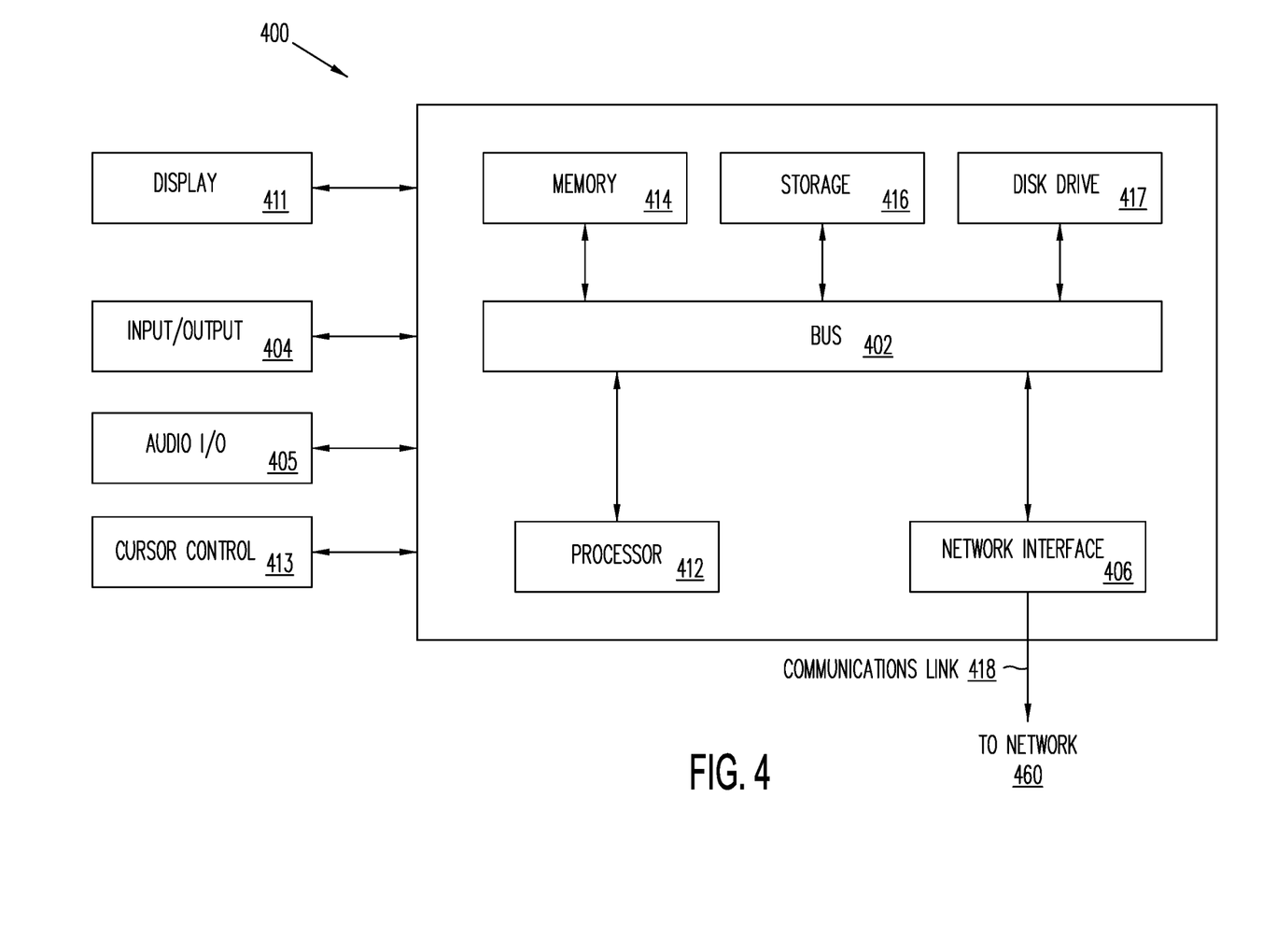
FIG. 4 is a block diagram of an example of a computer that is suitable for use in the system for facilitating shared mobile payments, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The system for facilitating shared mobile payments can be used in various different ways. Requests for participation, messages, and contributions can flow among potential participants and participants in various different ways. Contributions can also flow in various different ways. Two examples of ways in which requests and contributions can flow are discussed with respect to FIGS. 5 and 6 below.

Figure 5:
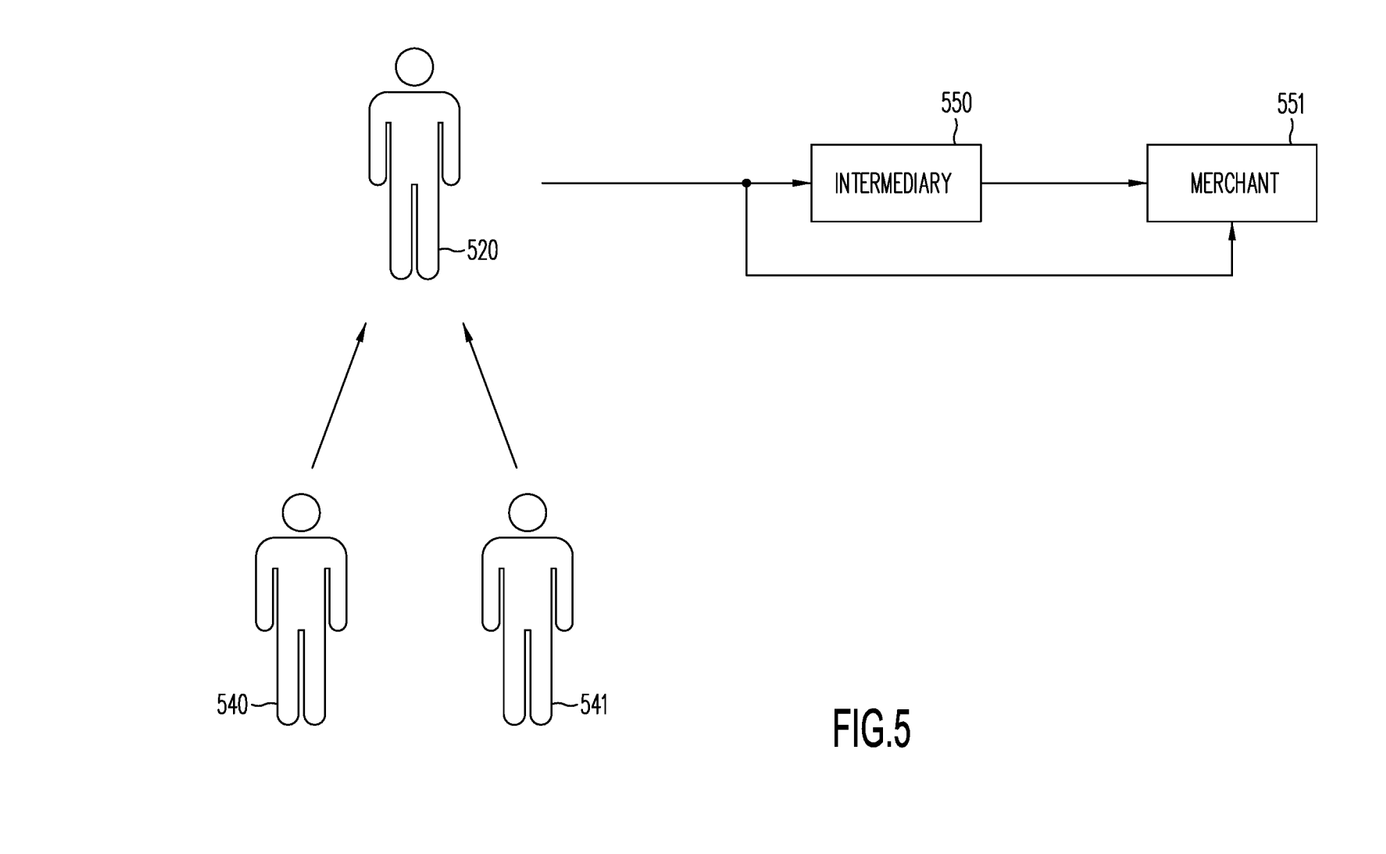
FIG. 5 is a block diagram showing an example of use of the system for facilitating shared mobile payments, according to an embodiment.

FIG. 5 is a block diagram showing an example of use of the system for facilitating shared mobile payments, according to an embodiment. More particularly, FIG. 5 shows money or contribution flows between the first user 520, two second users 540 and 541, an intermediary 550 and a merchant 551. The intermediary 550 can be a person, a credit card company, a bank, a payment provider, payment facilitator, or any other entity.

According to this example, each of the second users 540, 541 can transfer their contribution to the first user 520. The first user 520 can then transfer the combined contributions either directly to the merchant 551 from whom the product is being purchased or to the merchant 551 via the intermediary 550. All or any such transfers can be performed substantially automatically. All or any such transfers can be performed without intervention or authorization of the first user 520 and/or the second users 540 and 541. All or any such transfers can require intervention or authorization of the first user 520 and/or the second users 540 and 541. The need for user intervention or authorization can be defined, such as on a user-by-user basis, during a setup of the shared payment apps 124, 144.

Figure 6:
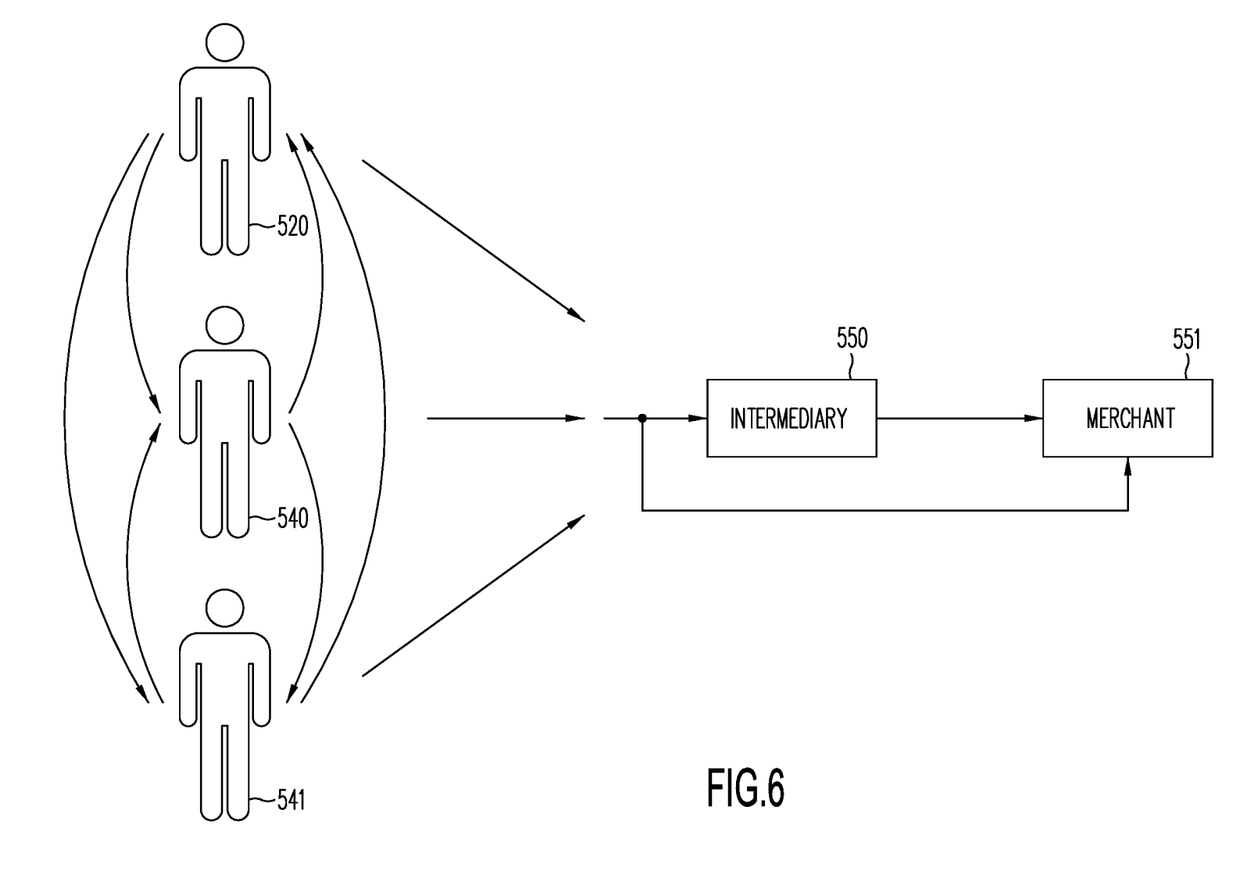
FIG. 6 is a block diagram showing another example of use of the system for facilitating shared mobile payments, according to an embodiment.

FIG. 6 is a block diagram showing another example of use of the system for facilitating shared mobile payments, according to an embodiment. FIG. 6 again shows money or contribution flows between the first user 520, two second users 540 and 541, an intermediary 550 and a merchant 551. However, as shown in FIG. 6 payment can be made to the intermediary 550 or the merchant 551 by any one or any combination of the first user 520 and the second user 540 and 541.

According to this example, each of the first user 520 and second users 540, 541 can transfer their contribution to any other one of the first user 520 and second users 540, 541. The first user 520 or second user 540, 541 to whom the money is transferred can then transfer the combined contributions either directly to the merchant 551 from whom the product is being purchased, to the merchant 551 via the intermediary 550, or to another second user 540, 541 (who can then transfer the contributions to the merchant 551 or the intermediary 550).

Alternatively, more than one of the first user 520 and second users 540, 541 can transfer their own contribution or any contributions either directly to the merchant 551 from whom the product is being purchased or to the merchant 551 via the intermediary 550. For example, each one of the first user 520 and second users 540, 541 can transfer their own contribution directly to the merchant 551 from whom the product is being purchased or to the merchant 551 via the intermediary 550.

As a further example, the second user 540 can transfer a contribution to the first user 520. Then, the first user 520 can transfer the contributions of the first user 520 and the second use 540 while the second user 541 can transfer the contribution of the second user 541.

Some of the first user 520 and second users 540, 541 can transfer contributions directly to the merchant 551 and others of the first user 520 and second users 540, 541 can transfer their contributions to the merchant 551 via the intermediary. There can be any number of intermediaries though which the contributions flow in various different manners (such as serially through the intermediaries, in parallel though the intermediaries, or any combination of serially and in parallel though the intermediaries).

Contributions can be split. For example, the second user 540 can give a portion of a contribution to the first user 520 who then transfers the portion to the merchant and the second user 540 can give another portion to the merchant 551. Thus, contributions can be transferred in any desired manner amount the first user 520 and second users 540, 541 and to the intermediate 550 and/or merchant 551.

All or any such transfers can be performed substantially automatically. All or any such transfers can be performed without intervention or authorization of the first user 520 and/or the second users 540 and 541. All or any such transfers can require intervention or authorization of the first user 520 and/or the second users 540 and 541. The need for user intervention or authorization can be defined, such as on a user-by-user basis, during a setup of the shared payment apps 124, 144.

Referring to FIGS. 5 and 6, requests for participation can be broadcast from the first user 520 to all potential participants (potential second users) generally simultaneously, from one potential participant to another serially, or any combination of both. For example, an initial broadcast of a request for participation can be sent from the first user 520 to potential participants, such as second users 540 and 541. Each of the potential second users 540 and 541 can then broadcast the request for participation to further second users or can selectively request the participation of such further second users serially.

As a further example, requests for participation can be sent serially from the first user 520 to selected potential participants (potential second users). The second users 540 and 541 can then broadcast the request for participation for further second users or can selectively request the participation of such further second users serially. The request flows, like the contribution flows, can follow and desired paths. The request flows, like the contribution flows, can include any combination of serial and parallel paths.

For example, an NFC sticker can be posted in a public place like a library, office, train station, airport, bus stop or the like. The NFC sticker can be attached to a poster or other advertisement referring to or representing a product that can be purchased. In this example, the NFC sticker refers to a floor vase with a total purchase price of $100. An interested buyer, such as the first user 520, can tap the mobile device 120, over the NFC sticker to place an order for the vase and to initiate a shared payment transaction to pay for the vase. According to this example, it is the intent of first user 520 to have a group of second users, e.g., second users 540 and 541, share in the purchase because the floor vase will be used in the group's office.

The first user 520 can tap the first user's mobile device 120 over the NFC sticker. The first user 520 can view a checkout page with the updated transaction amount, including shipping and taxes. Then, the first user 520 can tap the first user's mobile device 120 with the second users' mobile devices 140. The communication of information effected by such tapping can cause the payment provider to present a pop-up message on the second users' mobile devices 140. The pop-up message can, for example, include "Click Accept to contribute to this payment of $108.75". The pop-up message can include a suggested contribution, such as a contribution resulting from splitting the payment equally amount the group (the first user 520 and the second users 540 and 541).

The second users 540 and 541 can then either accept or decline to contribute to the payment of the transaction initiated by first user 520. Each second user 540, 541 can enter the amount of each individual contribution. The contribution may be sent directly to an account of the first user 520 or to an account of the intermediary 550 or the merchant 551. In the former instance, the first user 520 can pay the total amount to the intermediary 550 or the merchant 551 and the first user 520 can receive payments from the second users 540 and 541. In the instance, after all users have entered their contribution, the first user 520 can view, such as via the first user's mobile device 120, an updated total reflecting the various payments made by others to the intermediary 550 or the merchant 551. The first user 520 can then pay the remaining portion to the merchant.

The first user 520 and the second users 540 and 541 can be buyers paying for a single item from a seller. The shipping address can be an address of the first user 520 who initiated the payment process or the shipping address can changed by the first user 520 to a different shipping address. For example, shipping address can be an address of the first user 520 to an address of the second user 540 or the second user 541.

The payment or the contribution amount does not need to fixed. The contribution amount can be dynamically split in any way, such as determined by the first user 520, by the second users 540 and 541, by a pre-determined ratio, or by any other desired method.

There is no restriction on the number of users who want to be contributors toward that single transaction. Anybody who taps the first user's mobile device 520 or communicates with the first user's mobile device 120 can become a contributor. Users can contribute even by tapping another contributor's mobile device, e.g., the second user's mobile device 140. For example, the second user 541 can tap the second user's mobile device 140 of second user 540. The second user 541 may then send a payment to second user 540 as a contribution to the payment made by the second user 540 to first user 520. The second user 541 can send a contribution directly or indirectly (such as via the second user 540) to the first user 520, the intermediary 550, or the merchant 551.

There can be a time limit as for making contributions. The time limit can be based on when the first user 520 receives the payment page of the shared payment 124 after the initial purchase request from the scanned NFC sticker. The time limit can be a preset period of time, such as ten minutes, thirty minutes, an hour, or a day. The time limit can be an indeterminate time limit, such as until the first user 520 completes or abandons the initial purchase request. The time limit may be based on the period of inactivity between taps of users. In one embodiment, second users may continue to tap or communicate with the first user (or others second users) to contribute to the purchase as long as the transaction is still pending, e.g., not completed or abandoned.

As a further example, an NFC sticker can be placed on a notice board of a coffee shop. The notice board and the sticker can be an advertisement for the purchase of a product priced at $100.

The first user 520 and the second users 540 and 541 can be friends who are in the coffee shop together. The first user 520 and the second users 540 and 541 can have their smart phones, e.g., the first user's mobile device 120 and two second users' mobile devices 140, with them and NFC enabled.

After discussing the purchase, the first user 520 can tap the sticker. The first user can then view a payment provider checkout page. The checkout page can provide the total amount of the payment for the product. At this point the contributors, and more particularly the number of contributors, has not yet been defined.

The first user 520 can tap phones with the second users 540 and 541. The first user 520 can tap phones with each of the two second users' mobile devices 140. Alternatively, the first user 520 can tap the second user's mobile device 140 for the second user 540 and the second user 540 can tap the second user's mobile device 140 for the other second user 541. Generally, any of the first user 520 and the second users 540 and 541 can tap in any order and/or can tap simultaneously. Since only one purchase is pending among the three people, it is clear that all three intend to participate in the same purchase.

After the tapping, the second user 540 and the second user 541 can see a pop-up message on each of their respective second users' mobile devices 140. The pop-up can state "Click 'Accept' to contribute to the payment of $100". The pop-up can further state or suggest the amount the contribution.

After accepting or agreeing to contribute, second user 540 and second user 541 can contribute to the payment initiated by the first user 520 instantly, either to the first user 520 or to the intermediary 550 or the merchant 551. Any contribution can flow through any contributor and/or the intermediary to reach the merchant 551.

The first user 520 can receive a notification or update regarding the money contributed by the second user 540 and/or the second user 541, as each of the second user 540 and/or the second user 541 approves or declines to make the contribution. If the second user 540 or the second user 541 declines to make the contribution, the shared payment app 124 can recalculate the necessary contribution of the first user 520 and any second user who will contribute.

Thus the first user 520, the second user 540 and the second user 541 can share payment for this product and can complete the transaction. In this manner, the merchant can a single payment (e.g., the sum of all three payments contributed by the three users), which is processed and consolidated by the payment provider. Alternative, the merchant 551 can receive separate payments from the users or any combination of the users.

The product can then be shipped to the first user 520 or to another designated shipping address. The first user 520, the second user 540, or the second user 541 can designate the shipping address.

As a further example three friends can visit a restaurant to have dinner. Each friend can order their own favorite food. A single bill or invoice can generated for all three of the friends. The first user 520 can tap the POS terminal of the restaurant with the first user's mobile device 120. In response to tapping, the first user 520 can view a checkout page provided by the payment app 124.

The two second users 540 and 541 can tap their second users' mobile devices 140 with the first user's mobile device 120, such as while the first user's mobile device is displaying the checkout page or a page that prompts such tapping by contributors. After tapping, the two second users 540 and 541 can view a pop-up message asking "Do you want to contribute to the payment of $60?" Each of the two second users can click Accept or can click decline. For example, one second user 540 can click Accept to contribute via the shared mobile payments system while the other second user 541 can click decline to pay with cash.

After accepting, the second users 540 and/or 541 can contribute the payment initiated by first user 520 instantly. Such payment can be performed by the shared mobile payment app 124 automatically, without verification, or can be performed with verification by the second users 540 and/or 541. The first mobile user 520 can receive a notification regarding the contributions by the second users 540 and/or 541. In this manner, the three friends can receive a single bill or invoice and can conveniently and easily share the payment.

In some instances, not all of the members of the group (e.g., not all of the second users) will have a second user's mobile device 140 that incorporates the latest technology. For example, not all of the second users will have a smart phone with NFC. Some of the members of the group can have cellular telephones that lack NFC and other members of the group can have cellular telephones that have NFC.

In this instance, a first user who has an NFC enabled cellular telephone (the first user's device 120) can tap the NFC sticker. The app 124 can then provide the second users with a link. The link can contain the transaction or reference ID for the purchase. The transaction or reference ID can be used to facilitate sharing of the purchase by the second users.

For example, after tapping the NFC sticker, a share button and/or any other desired information can appear on the screen of the first user's cellular telephone or mobile device 120. The first user can select the share button. Then, any of the second users who have cellular telephones or second user's mobile devices 140 with NFC can tap the first user's cellular telephone or mobile device 120 to obtain the link and thereby share in the purchase, as discussed herein.

Any of the second users who do not have NFC can otherwise obtain the link and can thereby share in the purchase. For example, second users who do not have NFC can obtain the link by communicating with one of the users who has the link (such as the first user who tapped the NFC sticker or one of the second users who obtained the link from the first user). For example a user who does not have NFC can obtain the link via Bluetooth, text messaging, email, verbally, or any other means of communication. In this manner, those second users who cannot communicate via NFC can obtain the necessary information to share in the purchase without using NFC.

The link can be communicated among the first user and the second users in any manner. Thus, no specific technology, such as NFC or Bluetooth is necessary to practice the shared mobile payments method and system described herein.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "tap" can include scanning, imaging reading or otherwise determining information, such as a code, that is associated with a product. The information can be used to facilitate purchasing of the product. For example, the information can be embodied in a near field communication (NFC) sticker, a quick response (QR) code, a barcode, a stock keeping unit (SKU), or the like. The information can include an identification of the product and/or a price of the product. Tapping can include tapping, bumping, touching, or bringing a mobile device into contact or proximity with a sticker. The term "tap" can refer to any means of using a mobile device to identify a product, such as for a purchase of the product.

As used herein, the term "tap" can include tapping, bumping, touching, or bringing two or more mobile devices proximate one another, such as to initiate communications of any type therebetween. The term "tap" can the initiation of communications, such as NFC, between mobile devices by any means.

As used herein, the term "sticker" can refer to any near field communication (NFC) sticker, a quick response (QR) code, a barcode, a stock keeping unit (SKU), or the like. A sticker can be any printed matter, label, or device that can be used to identify a product to a mobile device. The sticker can be part of the product, attached to the product, on packaging of the product, on a display of the product, proximate the product, or remotely located with respect to the product.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method for sharing transactions between devices, the method comprising:
    determining, at a first instance of a shared application on a first mobile phone of a first user, an intent to initiate a transaction to purchase a product or service from a merchant and an intent for sharing a payment for the product or service between the first user and another user;
    initiating processing, by the first instance of the shared application, of the transaction to purchase the product or service, the initiating of the processing comprising determining of a transaction or reference identification (ID) that references the transaction that is being processed by the first instance of the shared application;
    providing the transaction or reference ID to a second instance of the shared application at a second mobile phone of a second user, the transaction or reference identification (ID) for accessing the transaction at the second instance of the shared application at the second mobile phone, wherein the second user is determined to be the other user;
    determining, based on a user selection initiated at the second mobile phone via the second instance of the shared application, a second portion of the payment indicated by the second user; and
    communicating with a payment processor to process the payment to an account of the merchant as shared using a first portion of the payment and the second portion of the payment between a first user account of the first user and a second user account of the second user.

2. The method of claim 1, wherein said determining the intent for the transaction is based on receiving a first user selection at a graphical user interface (GUI) of the first instance of the shared application.

3. The method of claim 1, wherein said determining the intent to share the payment for the product or service between the first user and the other user is based on receiving a first user selection at a graphical user interface (GUI) of the first instance of the shared application.

4. The method of claim 1, further comprising determining a communication address of the second user, wherein the providing the transaction or reference ID to the second instance of the shared application is performed using the communication address.

5. The method of claim 1, wherein the providing the transaction or reference ID to the second instance of the shared application comprises communicating between the first instance of the shared application and the second instance of the shared application.

6. The method of claim 1, wherein the providing the transaction or reference ID to the second instance of the shared application comprises communicating the transaction or reference ID using a social network.

7. The method of claim 1, further comprising:
determining that the second user is the other user based on an interaction between the first mobile phone and the second mobile phone.

8. The method of claim 7,
wherein the interaction between the first mobile phone and the second mobile phone comprises a request to participate in the sharing of the payment between the first mobile phone and the second mobile phone.

9. A device comprising:
a non-transitory memory storing program instructions; and
one or more hardware processors coupled to the non-transitory memory and configured to execute the program instructions to cause the device to,
display a graphical user interface (GUI) of a first instance of a shared application on the device of a first user, the first instance of the shared application for communicating with other instances of the shared applications on other devices, the first instance of the shared application further for communicating with a payment processor for processing of transactions;
determine, based on a user selection in the GUI, an intent to share payment for a transaction between a first user account, of the first user, at the payment processor and an account of another user;
provide a transaction or reference ID to a second instance of the shared application at a second user device of the second user, the transaction or reference identification (ID) for referencing the transaction at the second instance of the shared application at the second user device, wherein the second user is determined to be the other user;
determine, based on interaction with the second user device, a second portion of the payment indicated by the second user; and
communicate with a payment processor to process the payment to an account of a merchant as shared using a first portion of the payment and the second portion of the payment between a first user account of the first user and a second user account of the second user.

10. The device of claim 9, wherein executing the instructions further causes the device to determine a communication address of the second user, wherein the providing the transaction or reference ID to the second instance of the shared application is performed using the communication address.

11. The device of claim 9, wherein executing the instructions further causes the device to determine the first portion of the payment based on the interaction with the second user device.

12. The device of claim 9, wherein the providing the transaction or reference ID to the second instance of the shared application comprises communicating between the first instance of the shared application and the second instance of the shared application.

13. The device of claim 9, wherein the providing the transaction or reference ID to the second instance of the shared application comprises communicating the transaction or reference ID using a social network.

14. The device of claim 9, wherein executing the instructions further causes the first instance of the shared application to determine that the second user is the other user based on an interaction via short-wave wireless communication between the device and the other device.

15. A non-transitory machine-readable medium having stored thereon machine-readable instructions executable to cause a machine to perform operations comprising:
displaying a graphical user interface (GUI) of a first instance of a shared application on a mobile device of a first user, the first instance of the shared application for communicating with other instances of the shared applications on other devices, the first instance of the shared application configured for to send processing requests to a payment processor for processing of transactions using a first user account at the payment processor;
determining, based on detecting a user selection in the GUI, an intent to share payment for a transaction between a first user account at the payment processor and a payment instrument associated with another user;
providing a link to a second instance of the shared application at a second user device of the second user, the link for referencing the transaction at the second instance of the shared application at the second user device, wherein the second user is determined to be the other user;
determining, based on interaction with the second instance of the shared application, a second portion of the payment indicated by the second user; and
sending a processing request to the payment processor to process the payment to a merchant using a first portion of the payment and the second portion of the payment between a first user account of the first user and the payment instrument of the second user.

16. The non-transitory machine-readable medium of claim 15, wherein the providing the link to the second instance of the shared application comprises communicating the link using a social network.

17. The non-transitory machine-readable medium of claim 15, wherein the operations further comprise recalculating the first portion and the second portion based on one or more additional inputs to the first instance of the shared application or to the second instance of the shared application.

18. The non-transitory machine-readable medium of claim 15, wherein the operations further comprise determining a communication address of the second user, wherein the providing the transaction or reference ID to the second instance of the shared application is performed using the communication address.

19. The non-transitory machine-readable medium of claim 15, wherein the operations further comprise causing the first instance of the shared application to determine that the second user is the other user based on an interaction via short-wave wireless communication between the device and the other device.

20. The non-transitory machine-readable medium of claim 15, wherein the interaction between the mobile device and the second user device comprises the mobile device communicating a request to participate in the sharing of the payment to the second user device.

\* \* \* \* \*